US010219121B2

(12) United States Patent
Park

(10) Patent No.: US 10,219,121 B2
(45) Date of Patent: Feb. 26, 2019

(54) METHOD AND APPARATUS FOR TRANSMITTING AND RECEIVING MESSAGE USING CUSTOMIZED TAG

(71) Applicant: SAMSUNG ELECTRONICS CO., LTD., Suwon-si (KR)

(72) Inventor: Tae-suh Park, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/069,319

(22) Filed: Mar. 14, 2016

(65) Prior Publication Data

US 2016/0198320 A1 Jul. 7, 2016

Related U.S. Application Data

(63) Continuation of application No. 13/051,575, filed on Mar. 18, 2011, now Pat. No. 9,288,640.

(60) Provisional application No. 61/315,565, filed on Mar. 19, 2010.

(30) Foreign Application Priority Data

Oct. 6, 2010 (KR) .................. 10-2010-0097416

(51) Int. Cl.
| | |
|---|---|
| *H04W 4/14* | (2009.01) |
| *H04W 4/12* | (2009.01) |
| *H04W 4/18* | (2009.01) |
| *H04W 4/02* | (2018.01) |
| *H04W 4/04* | (2009.01) |

(52) U.S. Cl.
CPC .............. *H04W 4/14* (2013.01); *H04W 4/02* (2013.01); *H04W 4/12* (2013.01); *H04W 4/185* (2013.01); *H04W 4/043* (2013.01)

(58) Field of Classification Search
CPC ............................. H04W 12/08; G06Q 20/40
USPC ...... 455/411, 414.1, 466, 415, 414.4, 412.1;
713/168; 370/331, 395.42; 706/12;
709/239, 203, 206, 246, 572.1, 218;
348/143; 358/473
See application file for complete search history.

(56) References Cited

U.S. PATENT DOCUMENTS

| | | | |
|---|---|---|---|
| 8,422,642 | B2 | 4/2013 | Suito |
| 2005/0114455 | A1 | 5/2005 | Conroy et al. |
| 2007/0097879 | A1 | 5/2007 | Bleckert et al. |

(Continued)

FOREIGN PATENT DOCUMENTS

KR 10-2005-0100489 A 10/2005

OTHER PUBLICATIONS

Office Action issued in parent U.S. Appl. No. 13/051,575 dated Jun. 25, 2014.

(Continued)

*Primary Examiner* — Kiet M Doan
(74) *Attorney, Agent, or Firm* — Sughrue Mion, PLLC

(57) ABSTRACT

A message receiving method and apparatus using a customized tag including: receiving a message including a first customized tag from a message transmitting device; determining whether the first customized tag is included in the message, and, if the first customized tag is determined to be included in the message, extracting the first customized tag from the message; analyzing the first customized tag based on an extraction result; and controlling a message receiving device based on a control operation described in the first customized tag.

5 Claims, 7 Drawing Sheets

(56) References Cited

U.S. PATENT DOCUMENTS

| | | | |
|---|---|---|---|
| 2007/0248055 A1 | 10/2007 | Jain et al. | |
| 2008/0108327 A1* | 5/2008 | Hsu | H04L 51/24 |
| | | | 455/412.1 |
| 2008/0293397 A1 | 11/2008 | Gajdos et al. | |
| 2009/0006285 A1* | 1/2009 | Meek | G06Q 10/10 |
| | | | 706/12 |
| 2009/0066510 A1* | 3/2009 | Kamdar | H04M 1/72572 |
| | | | 340/572.1 |
| 2010/0046553 A1 | 2/2010 | Daigle et al. | |
| 2010/0287052 A1* | 11/2010 | Minter | G06Q 30/02 |
| | | | 705/14.64 |
| 2010/0313019 A1* | 12/2010 | Joubert | G06F 21/313 |
| | | | 713/168 |
| 2011/0154363 A1* | 6/2011 | Karmarkar | G06Q 10/087 |
| | | | 719/313 |

OTHER PUBLICATIONS

Office Action issued in parent U.S. Appl. No. 13/051,575 dated Dec. 12, 2014.
Office Action issued in parent U.S. Appl. No. 13/051,575 dated Jun. 11, 2015.
Notice of Allowance issued in parent U.S. Appl. No. 13/051,575 dated Nov. 5, 2015.

* cited by examiner

METHOD AND APPARATUS FOR TRANSMITTING AND RECEIVING MESSAGE USING CUSTOMIZED TAG

CROSS-REFERENCE TO RELATED PATENT APPLICATION

This is a continuation application of U.S. application Ser. No. 13/051,575 filed Mar. 18, 2011, which claims the benefit of U.S. Ser. No. 61/315,565, filed on Mar. 19, 2010, in the U.S.P.T.O, and Korean Patent Application No. 10-2010-0097416, filed on Oct. 6, 2010, in the Korean Intellectual Property Office, the disclosures of which are incorporated herein in their entirety by reference.

BACKGROUND

1. Field

Exemplary embodiments relate to a method and apparatus for transmitting and receiving a message, and more particularly to, a method and apparatus for transmitting and receiving a message using a customized tag, which enables bi-directional control of devices by using a multimedia messaging service (MMS) and a short message service (SMS) that include a customized tag.

2. Description of the Related Art

As network convergence increases so does the demand for the capability of devices to interact between themselves. In particular, there is an increasing demand for providing a new service by which cellular phones can interact with other devices.

When the related art technology monitors or controls a device within a home network by using a cellular phone in a remote place, a data communication service provided in a cellular network has been used to communicate between the cellular phone and the device within the home network. Although a variety of additional services have been developed to communicate between the cellular phone and the device within the home network, these services need dedicated additional service programs and incur continuous data communication service charges.

Meanwhile, a multimedia messaging service (MMS) and a short message service (SMS), which are remote communication methods between devices, are not designed to bi-directionally control devices.

SUMMARY

Exemplary embodiments provide a method and apparatus for transmitting and receiving a message using a customized tag, which enables bi-directional control of devices by using a multimedia messaging service (MMS) and a short message service (SMS) that include a customized tag, and a computer readable recording medium storing a program for executing the method.

According to an aspect of exemplary embodiments, there is provided a message receiving method using a customized tag, the method including: receiving a message including a first customized tag from a message transmitting device; determining whether the first customized tag is included in the message, and, if the first customized tag is determined to be included in the message, extracting the first customized tag from the message; analyzing the first customized tag based on an extraction result; and controlling a message receiving device based on a control operation described in the first customized tag.

The message may include short message service (SMS) and multimedia messaging service (MMS) messages.

The first customized tag may be described by using a predetermined tag for controlling a message receiving device to perform a predetermined operation.

The first customized tag may be described by using a synchronized multimedia integration language (SMIL).

The first customized tag may comprise: information that is to be returned to the message transmitting device as a callback, wherein the method further includes: generating a message including a second customized tag that includes information selected by the message receiving device from the information that is to be returned to the message transmitting device as the callback based on a control result; and transmitting the message including the second customized tag to the message transmitting device.

The first customized tag may include at least one of an identifier of the message receiving device and a password as an attribute.

The controlling of the message receiving device based on the control operation described in the first customized tag may include; if at least one of an identifier of the message receiving device and a password included in the first customized tag is identical to at least one of the identifier of the message receiving device and an externally input password, controlling the message receiving device based on the control operation described in the first customized tag.

The analyzing of the first customized tag based on an extraction result and the controlling of the message receiving device based on the control operation described in the first customized tag may be realized by using a plug-in application.

According to another aspect of exemplary embodiments, there is provided a message transmitting method using a customized tag, the method including: generating a message including a first customized tag; and transmitting the message to a message receiving device, wherein the message comprises SMS and MMS messages, wherein the first customized tag is described by using a predetermined tag for controlling the message receiving device to perform a predetermined operation.

The first customized tag may be described by using a SMIL.

The first customized tag may include: information that is to be returned to a message transmitting device as a callback, wherein the method further includes: receiving a message, from the message receiving device, including a second customized tag that includes information selected by the message receiving device from the information that is to be returned to the message transmitting device as the callback based on a control result of the message receiving device.

The method may further include: determining whether a second customized tag is included in the message receiving device; if the second customized tag is determined to be included in the message receiving device, extracting the second customized tag from the message receiving device; analyzing the second customized tag based on an extraction result; and controlling the message transmitting device based on a control operation described in the second customized tag.

The first customized tag may include at least one of an identifier of the message receiving device and a password as an attribute.

The transmitting of the message to the message receiving device may include: transmitting the message to the message receiving device based on one of a predetermined period, an external input, and a predetermined event.

The method may be realized by using a plug-in application.

According to another aspect of exemplary embodiments, there is provided a computer readable recording medium having recorded thereon a program for executing the method.

According to another aspect of exemplary embodiments, there is provided a message receiving device using a customized tag, the device including: a message receiving unit which receives a message including a first customized tag from a message transmitting device; a message parsing unit which determines whether the first customized tag is included in the message, and, if the first customized tag is determined to be included in the message, extracts the first customized tag from the message; a customized tag analyzing unit which analyzes the first customized tag based on an extraction result; and a control unit which controls the message receiving device based on a control operation described in the first customized tag.

According to another aspect of exemplary embodiments, there is provided a message transmitting device using a customized tag, the device including: a message generating unit which generates a message including a first customized tag; and a message transmitting unit which transmits the message to a message receiving device, wherein the message comprises SMS and MMS messages, wherein the first customized tag is described by using a predetermined tag for controlling the message receiving device to perform a predetermined operation.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF EXEMPLARY EMBODIMENTS

Figure 1:
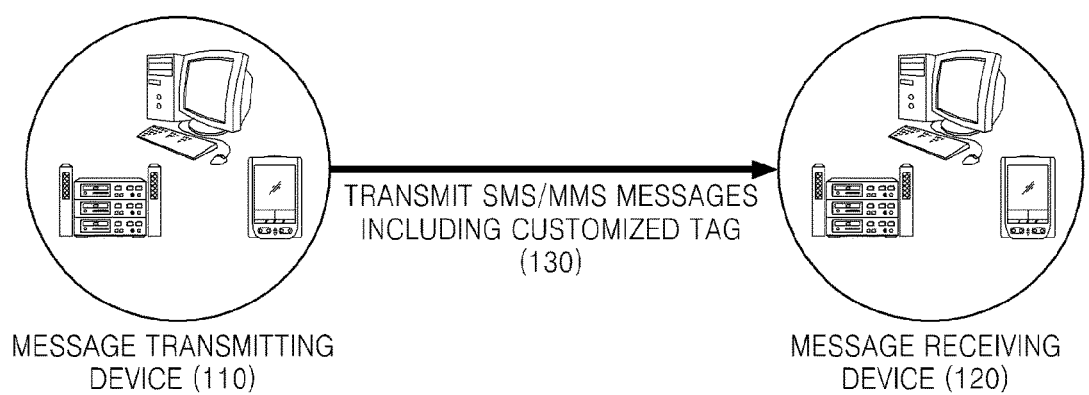
FIG. 1 is a schematic view for explaining a method of transmitting and receiving a message using a customized tag according to an exemplary embodiment.

Aspects of the inventive concept will now be described more fully with reference to the accompanying drawings, in which exemplary embodiments are shown Like reference numerals in the drawings denote like elements. In the drawings, the thicknesses of layers and regions are exaggerated for clarity.

FIG. 1 is a schematic view for explaining a method of transmitting and receiving a message using a customized tag according to an exemplary embodiment. Referring to FIG. 1, the customized tag is introduced into a short message service (SMS) and/or a multimedia messaging service (MMS) message that include a standard tag. The customized tag means a symbol identifying functions defined according to a prior agreement between a message transmitting device 110 and a message receiving device 120. The symbol is used with SMS and MMS messages having a tag structure and is compatible with the tag structure. The customized tag will be described in more detail with reference to FIG. 2. The message may include SMS and/or MMS messages, and it is obvious to one of ordinary skill in the art that the message may include other types of messages.

The message transmitting device 110 generates the message including the customized tag, and transmits the message to the message receiving device 120.

The message receiving device 120 receives the message including the customized tag from the message transmitting device 110. The message receiving device 120 determines whether the customized tag is included in the received message, if the customized tag is determined to be included in the received message, extracts the customized tag from the received message, and analyzes the customized tag. The message receiving device 120 is controlled based on a control operation described in the customized tag.

The controlling of the message receiving device 120 using the customized tag includes various interworking means between devices, such as input/output of information included in the customized tag, control of other elements of the message receiving device 120, and return of information as a callback to the message transmitting device 110.

A bi-directionality function can be given to the SMS and MMS messages, and thus various interworking means between devices for bi-directionally controlling devices can be provided. Various interworking means between devices using the SMS and MMS messages including the customized tag can be provided via a simple correction of a module related to the SMS and MMS messages of the message transmitting device 110 and the message receiving device 120 without further modification of a mobile communication network.

Figure 2:
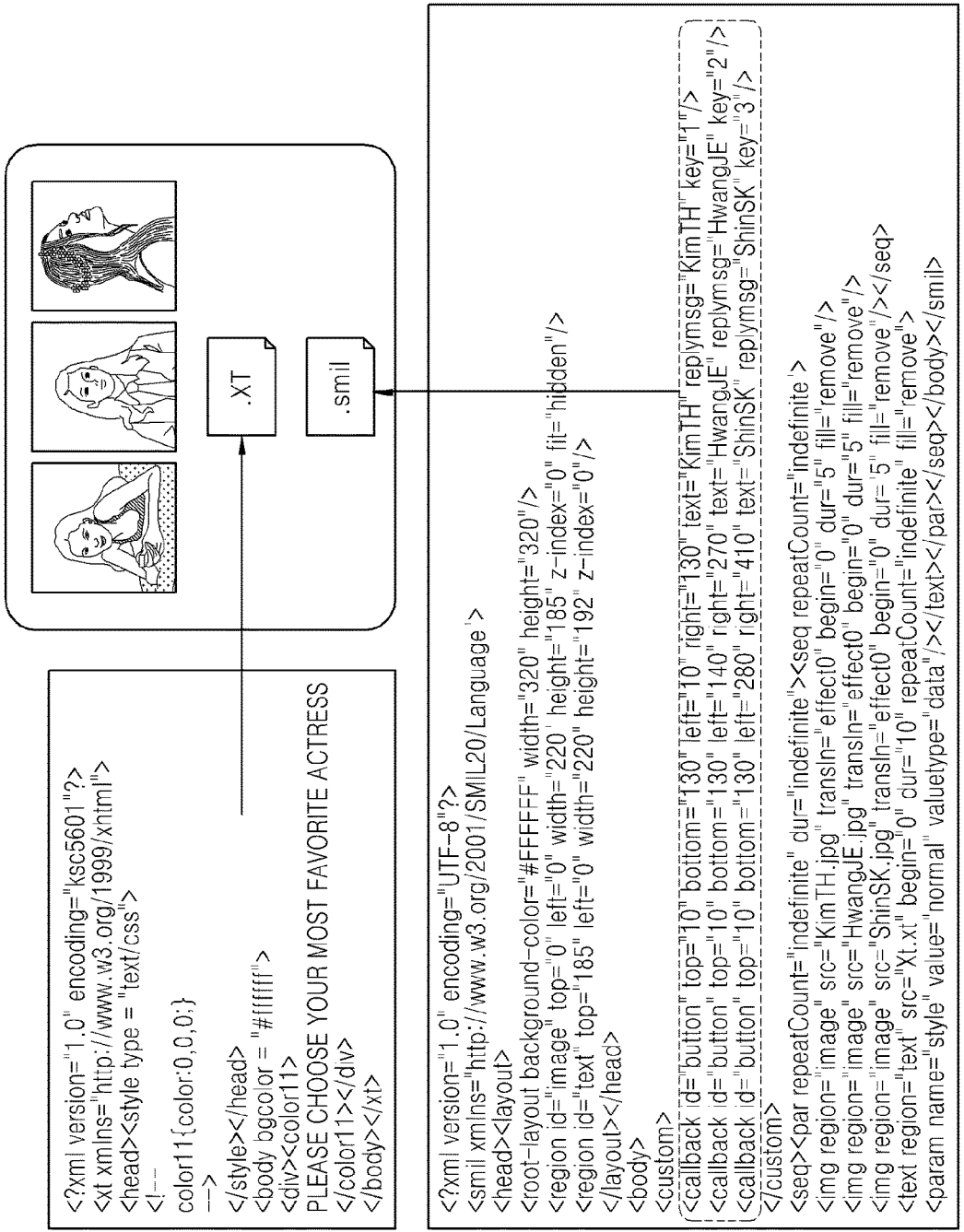
FIG. 2 illustrates a multimedia messaging service (MMS) message including a customized tag according to an exemplary embodiment.

FIG. 2 illustrates an MMS message including a customized tag according to an exemplary embodiment. Referring to FIG. 2, a new tag "<callback>" is declared to define the customized tag. The declared tag is defined to draw a button on a screen, if the button is pressed, generate a message for returning a value allocated to the button, and automatically transmit the message to the message transmitting device 110. The customized tag may be identified by a given MMS/SMS message parsing unit, so that the customized tag can provide the MMS/SMS message parsing unit with extensibility. The customized tag may include at least one attribute (or element).

Although a synchronized multimedia integration language (SMIL) is used to define the customized tag, it is obvious to one of ordinary skill in the art that other languages can be used to define the customized tag. The SMIL is a W3C standard presentation language for spatially and temporally arranging multimedia data and controlling a device by using an extensible markup language (XML). The customized tag is described according to an element description method of the SMIL, is extracted by a message parsing unit 370 (FIG. 3) of a message receiving device 350 (FIG. 3), and is analyzed by a customized tag analyzing unit 380 (FIG. 3).

The customized tag is inserted into the MMS message transmitted in a mobile communication network by using the tag "<callback>". The customized tag may be used, as an example, to collect a questionnaire survey in which a photo of a preferred actress is chosen from photos of three actresses.

Figure 3:
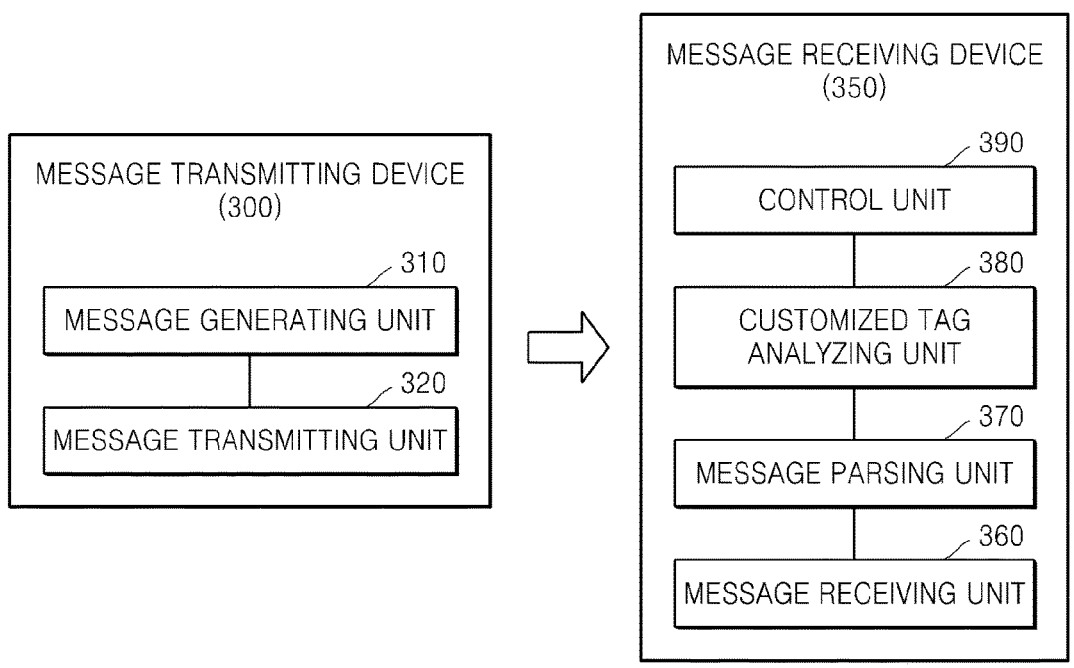
FIG. 3 is a schematic block diagram of a message transmitting device and a message receiving device according to an exemplary embodiment.

FIG. 3 is a schematic block diagram of a message transmitting device 300 and a message receiving device 350 according to an exemplary embodiment.

Referring to FIG. 3, the message transmitting device 300 includes a message generating unit 310 and a message transmitting unit 320. Although the message generating unit 310 and a message transmitting unit 320 may be realized by using a plug-in application, it is obvious to one of ordinary skill in the art that the message generating unit 310 and the message transmitting unit 320 can be realized by using other methods.

The message generating unit 310 generates a message including a customized tag. The customized tag is described by using a predetermined tag for controlling the message receiving device 350 to perform a predetermined operation. The message includes MMS and SMS messages. The customized tag may be described by using an SMIL.

The customized tag may include at least one of an identifier of the message receiving device 350 and a password as an attribute.

The message transmitting unit 320 transmits the message to the message receiving device 350.

The message transmitting unit 320 may transmit the message to the message receiving device 350 based on one of a predetermined period, an external input, and a predetermined event.

The message receiving device 350 includes a message receiving unit 360, a message parsing unit 370, a customized tag analyzing unit 380, and a control unit 390. Although the message receiving unit 360, the message parsing unit 370, the customized tag analyzing unit 380, and the control unit 390 may be realized by using a plug-in application, it is obvious to one of ordinary skill in the art that the message receiving unit 360, the message parsing unit 370, the customized tag analyzing unit 380, and the control unit 390 can be realized by using other methods.

The message receiving unit 360 receives the message including the customized tag from the message transmitting unit 300.

The message parsing unit 370 determines whether the customized tag is included in the received message, and, if the customized tag is determined to be included in the received message, extracts the customized tag from the received message.

The customized tag analyzing unit 380 analyzes the customized tag based on an extraction result.

The control unit 390 controls the message receiving device 350 based on a control operation described in the customized tag.

If at least one of an identifier of the message receiving device 350 and a password included in the customized tag is identical to at least one of the identifier of the message receiving device 350 and an externally input password, the control unit 390 may control the message receiving device 350 based on the control operation described in the customized tag.

A user scenario for home automation according to the present embodiment is presented below.

The message transmitting device 300 periodically measures location information thereof. The message transmitting device 300 may be a mobile terminal including a cellular phone. The location information of the message transmitting device 300 may be obtained by using a GPS module embedded therein or a direction indicator.

The message generating unit 310 of the message transmitting device 300 generates a message including the customized tag. The customized tag may be defined by using a tag "<userlocation>". An example of the customized tag with the tag "<userlocation>" is defined as "<userlocation id="mom" type="WGS84" latitude="37" longitude="126">".

The message transmitting unit 320 transmits the message to the message receiving device 350. In this case, the message transmitting unit 320 may transmit the message to the message receiving device 350 based on one of a predetermined period, an external input, and a predetermined event.

After the message is processed by the message receiving unit 360, the message parsing unit 370, and the customized tag analyzing unit 380 of the message receiving device 350, a current location of the message transmitting device 300 may be analyzed by using the tag "<userlocation>".

The control unit 390 compares the current location of the message transmitting device 300 with a previous location thereof, in order to automatically determine whether a user of the message transmitting device 300 is going out or coming home, for example.

When the user of the message transmitting device 300 is determined to be going out, the control unit 390 may control an air conditioner to be switched to a goingout mode.

When the user of the message transmitting device 300 is determined to be coming home, the control unit 390 may control the air conditioner to be switched to a normal mode from the going-out mode. Therefore, the control unit 390 can control the air conditioner in such a way that the user of the message transmitting device 300 feels good when the user comes home.

Alternatively, the control unit 390 may selectively control the air conditioner according to each of the users' spaces and preferences based on user identification information of the message transmitting device 300 analyzed in the customized tag.

In accordance with the user scenario for home automation, the control unit 390 of the message receiving device 350 can control various devices in a home network by transmitting and receiving the SMS and MMS messages without user recognition or intervention.

A user scenario for transmission of a secure image according to the present embodiment is presented below.

The message generating unit 310 of the message transmitting device 300 may generate a customized tag for transmission of the secure image when a personal image that is not desired to be viewed by a third party is transmitted via an MMS message.

The customized tag may be defined by using a tag "<secureimage>". An example of the customized tag is defined by using a tag "<secureimage src="mylook.jpg" callee="01190293860" password="1241365">".

The message transmitting unit 320 transmits the generated message to the message receiving device 350.

After processing in the message receiving unit 360, the message parsing unit 370, and the customized tag analyzing unit 380 of the message receiving device 350, an identifier of the message receiving device 350 and a password may be analyzed by using the tag "<secureimage>".

The control unit 390 can reproduce the secure image only when an identifier of the message receiving device 350 included in the customized tag is identical to the identifier of the message receiving device 350. Alternatively, the control unit 390 may receive an externally input password, and, if the externally input password is identical to a password included in the customized tag, reproduce the secure image.

Each of the message transmitting device 300 and the message receiving device 350 may further include an encryption module when the encryption module is necessary for a higher level of security. The encryption module of the message transmitting device 300 encrypts an image and transmits the encrypted image. The decryption module of the message receiving device 350 decrypts the encrypted image by using a decryption key and reproduces the image.

In accordance with the user scenario for transmission of the secure image, the customized tag is used to realize a function of encrypting the message when the SMS and MMS messages are transmitted and received, thereby achieving privacy protection. Further, when the SMS and MMS messages are erroneously transmitted, the customized tag is used to realize the function of encrypting the message, thereby preventing damage due to an erroneous transmission.

A user scenario for transmission of a secure text according to the present embodiment is presented below.

The message generating unit 310 of the message transmitting device 300 may generate a customized tag for transmission of the secure text when a personal image that is not desired to be viewed by a third party is transmitted via an MMS message.

The customized tag may be defined by using a tag "<securetext>". An example of the customized tag is defined by using a tag "<securetext txt="AEKD12#11@1DOQUQEPGEDG8&531" hint="jungjadongfavoriteshop name">". The message generating unit 310 generates the customized tag by receiving a text "be careful of a cold at a change of seasons . . . please come and see us frequently~Madame Jung" based on an external input, and encrypts the text by using a predetermined password.

The message transmitting unit 320 transmits the generated message to the message receiving device 350.

After processing by the message receiving unit 360, the message parsing unit 370, and the customized tag analyzing unit 380 of the message receiving device 350, an encrypted text and password hint may be analyzed by using the tag "<securetext>".

The control unit 390 controls the password hint included in the customized tag to be output, and controls an externally input password. The control unit 390 controls the encrypted text to be decrypted with the externally input password and controls the decrypted text to be output.

In accordance with the user scenario for transmission of the secure text, the customized tag is used to realize a function of encrypting the message when the SMS and MMS messages are transmitted and received, thereby achieving privacy protection. Further, when the SMS and MMS messages are erroneously transmitted, the customized tag is used to realize the function of encrypting the message, thereby preventing damage due to an erroneous transmission.

Figure 4:
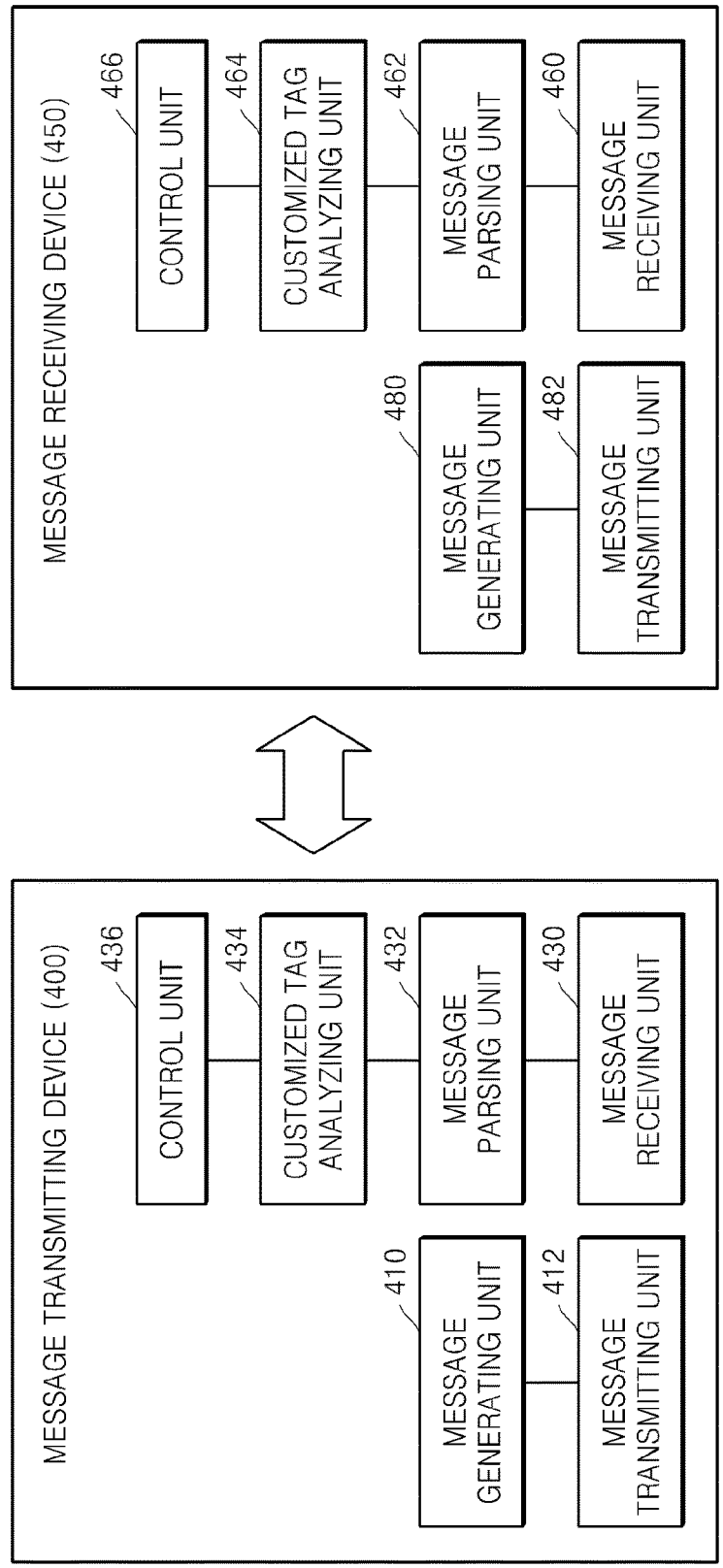
FIG. 4 is a schematic block diagram of a message transmitting device and a message receiving device according to another exemplary embodiment.

FIG. 4 is a schematic block diagram of a message transmitting device 400 and a message receiving device 450 according to another exemplary embodiment.

Referring to FIG. 4, the message transmitting device 400 includes a message generating unit 410, a message transmitting unit 412, a message receiving unit 430, a message parsing unit 432, a customized tag analyzing unit 432, and a control unit 436. Although the message generating unit 410, the message transmitting unit 412, the message receiving unit 430, the message parsing unit 432, the customized tag analyzing unit 434, and the control unit 436 may be realized by using a plug-in application, it is obvious to one of ordinary skill in the art that the message generating unit 410, the message transmitting unit 412, the message receiving unit 430, the message parsing unit 432, the customized tag analyzing unit 434, and the control unit 436 can be realized by using other methods.

The message generating unit 410 generates a message including a first customized tag. The first customized tag is described by using a predetermined tag for controlling the message receiving device 450 to perform a predetermined operation. The message includes MMS and/or SMS messages. The first customized tag may be described by using an SMIL.

The first customized tag may include at least one of an identifier of the message receiving device 450 and a password as an attribute.

The message transmitting unit 412 transmits the message to the message receiving device 450.

The message transmitting unit 412 may transmit the message to the message receiving device 450 based on a predetermined period, an external input, and a predetermined event.

The message receiving unit 430 receives, from the message receiving device 450, a message including a second customized tag that includes information selected by the message receiving device 450 from information that is to be returned to the message transmitting device 400 as a callback.

The message parsing unit 432 determines whether the second customized tag is included in the message, and, if the second customized tag is determined to be included in the message, extracts the second customized tag from the message.

The customized tag analyzing unit 434 analyzes the second customized tag based on an extraction result.

The control unit 436 controls the message transmitting device 400 based on a control operation described in the second customized tag.

The message receiving device 450 includes a message receiving unit 460, a message parsing unit 462, a customized tag analyzing unit 464, a control unit 466, a message generating unit 480, and a message transmitting unit 482. Although the message receiving unit 460, the message parsing unit 462, the customized tag analyzing unit 464, the control unit 466, the message generating unit 480, and the message transmitting unit 482 may be realized by using a plug-in application, it is obvious to one of ordinary skill in the art that the message receiving unit 460, the message parsing unit 462, the customized tag analyzing unit 464, the control unit 466, the message generating unit 480, and the message transmitting unit 482 can be realized by using other methods.

The message receiving unit 460 receives the message including the first customized tag from the message transmitting device 400.

The message parsing unit 462 determines whether the first customized tag is included in the message, and, if the first customized tag is determined to be included in the message, extracts the first customized tag from the message.

The customized tag analyzing unit 464 analyzes the first customized tag based on an extraction result.

The control unit 466 controls the message receiving device 450 based on a control operation described in the first customized tag.

If at least one of an identifier of the message receiving device 450 and a password included in the first customized tag is identical to at least one of the identifier of the message receiving device 450 and an externally input password, the control unit 466 may control the message receiving device 450 based on a control operation described in the customized tag.

The message generating unit 480 generates a message including the second customized tag that includes information selected by the message receiving device 450 from information that is to be returned to the message transmitting device 400 as a callback included in the first customized tag.

The message transmitting unit 482 transmits the message including the second customized tag to the message transmitting device 400.

Figure 5:
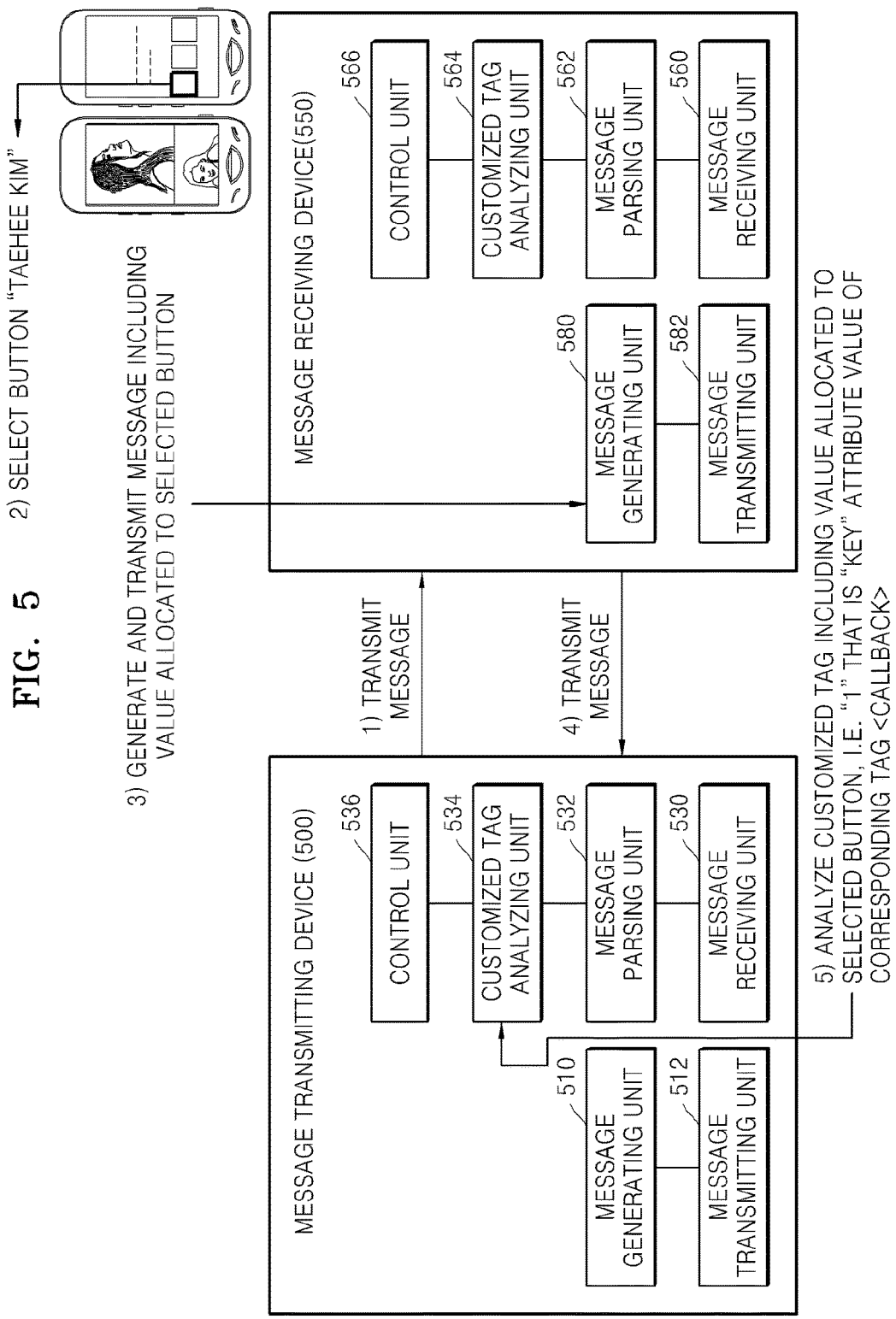
FIG. 5 is a block flow diagram for explaining an online questionnaire survey process using a customized tag according to an exemplary embodiment.

FIG. 5 is a block flow diagram for explaining an online questionnaire survey process using a customized tag according to an exemplary embodiment.

The online questionnaire survey process of the present embodiment uses the customized tag of FIG. 2.

Referring to FIG. 5, a message generating unit 510 of a message transmitting device 500 generates an MMS message including the customized tag of FIG. 2. The message transmitting unit 512 transmits the MMS message to the message receiving device 550.

After processing by a message receiving unit 560, a message parsing unit 562, and a customized tag analyzing unit 564 of the message receiving device 550, a control unit 566 may control buttons corresponding to three actresses that are described by using a tag "<callback>" to be output. The control unit 566 may control a button corresponding to a specific actress to be selected in response to an online questionnaire survey.

A message generating unit 580 of the message receiving device 550 generates an MMS message including a customized tag that includes a value allocated to the selected button as an attribute. A message transmitting unit 582 transmits the MMS message to the message transmitting device 500.

After sequential processing by a message receiving unit 530 and a message parsing unit 532 of the message transmitting device 500, a customized tag analyzing unit 534 analyzes the customized tag that includes the value allocated to the button selected by the message receiving device 550 as the attribute. The control unit 536 of the message transmitting device 500 may control information (e.g. the value allocated to the selected button, etc.) returned as a callback to be output.

Figure 6:
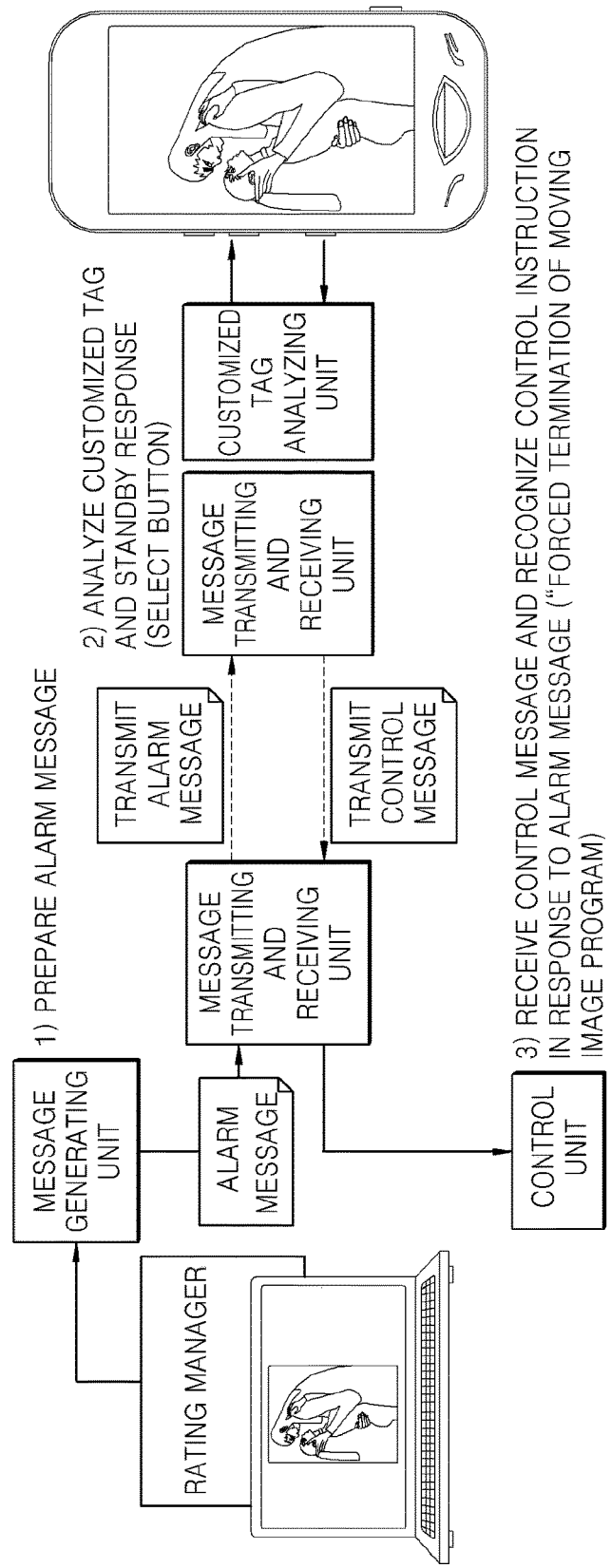
FIG. 6 is a block flow diagram for explaining a process of remotely controlling to reproduce a moving image according to an exemplary embodiment.

FIG. 6 is a block flow diagram for explaining a process of remotely controlling to reproduce a moving image according to an exemplary embodiment.

Referring to FIG. 6, the message generating unit 410 of the message transmitting device 400 generates an alarm message including information regarding the moving image captured by a rating manager as a customized tag. The message transmitting unit 412 transmits the alarm message to the message receiving device 450.

After sequential processing by the message receiving unit 460, the message parsing unit 462, and the customized tag analyzing unit 464 of the message receiving device 450, the control unit 466 may control information regarding the captured moving image described by using the customized tag to be output. The control unit 466 may control a control instruction regarding a corresponding moving image to be received from outside in response to the captured moving image.

The message generating unit 480 of the message receiving device 450 generates an MMS message including a customized tag that includes the control instruction regarding the corresponding moving image as an attribute. The message transmitting unit 482 transmits the MMS message to the message transmitting device 400.

After sequential processing by the message receiving unit 430 and the message parsing unit 432 of the message transmitting device 400, the customized tag analyzing unit 434 analyzes the customized tag that includes the control instruction regarding the corresponding moving image as the attribute input by the message receiving device 450. The control unit 436 of the message transmitting device 400 may control a reproduction device to execute the control instruction (e.g. a forced termination of a moving image program).

Figure 7:
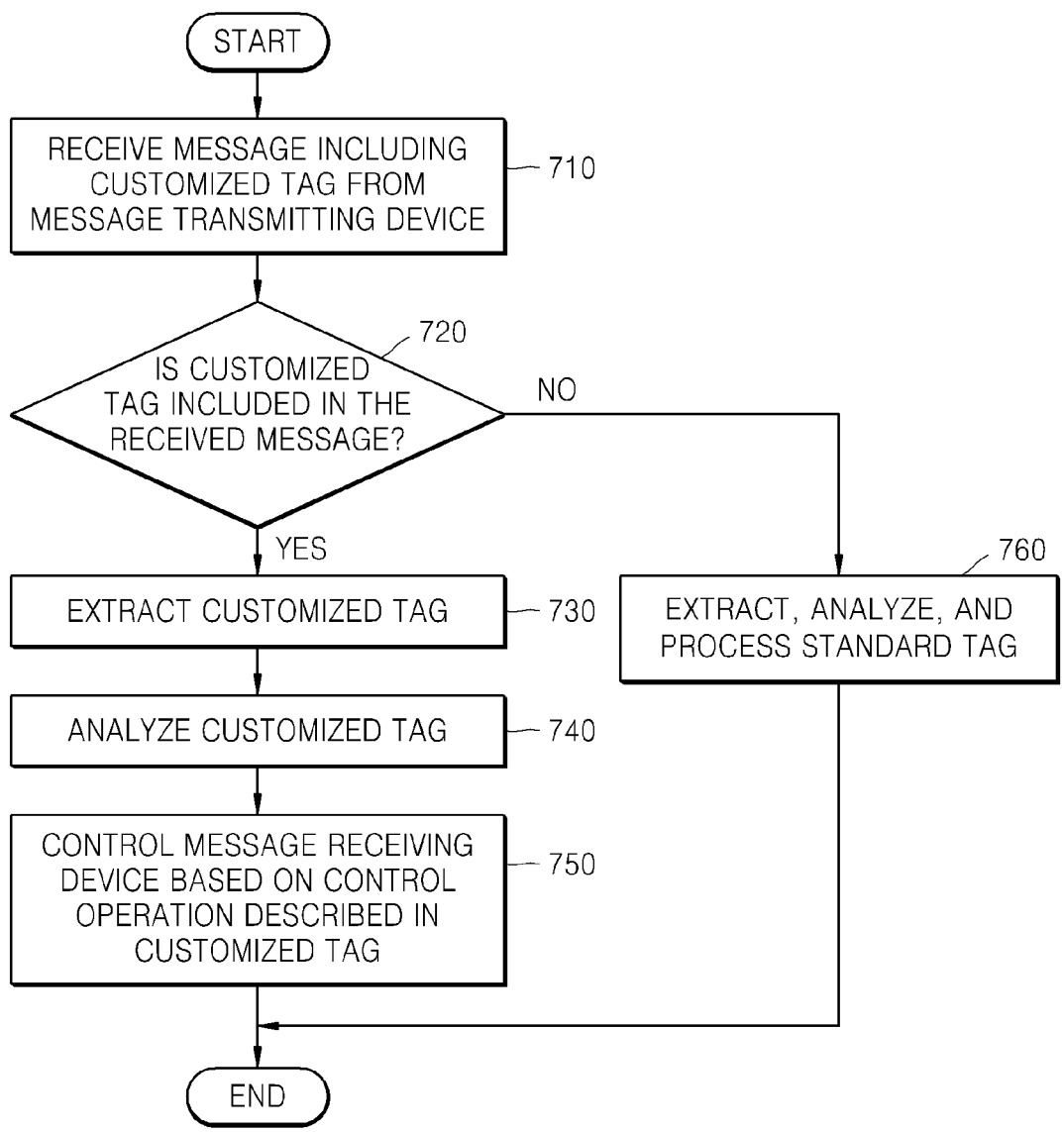
FIG. 7 is a flowchart of a message receiving method using a customized tag according to an exemplary embodiment.

FIG. 7 is a flowchart of a message receiving method using a customized tag according to an exemplary embodiment.

Referring to FIG. 7, in operation 710, the message receiving device 350 receives a message including the customized tag from the message transmitting device 300.

In operation 720, the message receiving device 350 determines whether the customized tag is included in the message. If the message receiving device 350 determines that the customized tag is included in the message, operation 730 is performed. If the message receiving device 350 determines that the customized tag is not included in the message, operation 760 is performed.

If the message receiving device 350 determines that the customized tag is included in the message, in operation 730, the message receiving device 350 extracts the customized tag from the message.

In operation 740, the message receiving device 350 analyzes the customized tag based on an extraction result.

In operation 750, the message receiving device 350 controls the message receiving device 350 based on a control operation described in the customized tag.

If at least one of an identifier of the message receiving device 350 and a password included in the customized tag is identical to at least one of the identifier of the message receiving device 350 and an externally input password, the message receiving device 350 may be controlled based on the control operation described in the customized tag.

If the message receiving device 350 determines that the customized tag is not included in the message, in operation 760, a standard tag is extracted, analyzed, and processed. The standard tag is processed according to the conventional art, and a detailed description thereof will not be provided here.

Although not shown, the message transmitting device 300 generates a message including the customized tag. The customized tag is described by using a predetermined tag for controlling the message receiving device 350 to perform a predetermined operation. The message includes MMS and SMS messages. The customized tag may be described by using an SMIL.

The customized tag may include at least one of the identifier of the message receiving device 350 and the password as an attribute.

The message transmitting device 300 transmits the message to the message receiving device 350.

The message transmitting device 300 may transmit the message to the message receiving device 350 based on one of a predetermined period, an external input, and a predetermined event.

The message transmitting devices 300 and 400 and the message receiving devices 350 and 450 according to exemplary embodiments may include buses coupled to the units of FIGS. 3 and 4, at least one processor coupled to the buses, and a memory coupled to the buses to store instructions, received messages, or generated messages and coupled to the at least one processor to perform the instructions stated above.

Exemplary embodiments can also be embodied as computer-readable code on a computer-readable storage medium. The computer-readable storage medium is any data storage device that can store data which can be thereafter read by a computer system. Examples of the computer-readable storage medium include read-only memory (ROM), random-access memory (RAM), CD-ROMs, magnetic tapes, floppy disks, optical data storage devices, etc. The computer-readable storage medium can also be distributed over network coupled computer systems so that the computer-readable code is stored and executed in a distributed fashion. Also, functional programs, codes, and code segments for accomplishing embodiments of the present invention can be easily programmed by programmers of ordinary skill in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A message receiving device, comprising: a message receiving unit configured to receive, using a communication network, a first message including a first customized tag from a message transmitting device, the first message comprising a plurality of items for selecting by the message receiving device;
   a control unit configured to control the message receiving device based on a control operation described in the first customized tag, the first customized tag being generated by the message transmitting device and the control operation being performed by displaying, at the message receiving device, the plurality of items included in the first message received from the message transmitting device based on the first customized tag and receiving a user input indicating a selection of at least one item from among the displayed plurality of items, the user input being made via the message receiving device by a user;
   a message generating unit which generates a second message including a second customized tag comprising at least one value corresponding to the at least one item selected by the user at the message receiving device; and
   a message transmitting unit which transmits the second message including the second customized tag to the message transmitting device,
   wherein the first customized tag comprises at least one of (i) a device identifier of the message receiving device and (ii) a password as an attribute.

2. The message receiving device of claim 1, wherein the first message comprises at least one of a short message service (SMS) message and a multimedia messaging service (MMS) message.

3. The message receiving device of claim 1, wherein the first customized tag is described by using synchronized multimedia integration language (SMIL).

4. The message receiving device of claim 1, wherein the control unit is further configured to, if at least one of the device identifier and the password included in the first customized tag is identical to at least one of an identifier of the message receiving device and an externally input password, the control unit controls control the message receiving device based on the control operation described in the first customized tag.

5. A message receiving method, comprising:
   receiving, by a message receiving device and via a communication network, a first message including a first customized tag from a message transmitting device, the first message comprising a plurality of items for selecting by the message receiving device;
   controlling the message receiving device based on a control operation described in the first customized tag, the first customized tag being generated by the message transmitting device and the control operation being performed by displaying, at the message receiving device, the plurality of items included in the first message received from the message transmitting device based on the first customized tag and receiving a user input indicating a selection of at least one item from among the displayed plurality of items, the user input being made via the message receiving device by a user;
   generating, by the message receiving device, a second message including a second customized tag comprising at least one value corresponding to the at least one item selected by the user at the message receiving device; and
   transmitting the second message including the second customized tag to the message transmitting device,
   wherein the first customized tag comprises at least one of (i) a device identifier of the message receiving device and (ii) a password as an attribute.

* * * * *